United States Patent
Lolli et al.

(10) Patent No.: US 7,901,310 B2
(45) Date of Patent: Mar. 8, 2011

(54) TWO-ARM BELT TENSIONER FOR A BELT DRIVE

(75) Inventors: Sergio Lolli, Ascoli Piceno (IT); Luca D'Amicantonio, San Bernardo Di Ivrea (IT)

(73) Assignee: Dayco Europe S.R.L., Chieti (IT)

( * ) Notice: Subject to any disclaimer, the term of this patent is extended or adjusted under 35 U.S.C. 154(b) by 837 days.

(21) Appl. No.: 10/541,259

(22) PCT Filed: Dec. 29, 2003

(86) PCT No.: PCT/EP03/51112
§ 371 (c)(1),
(2), (4) Date: Mar. 3, 2006

(87) PCT Pub. No.: WO2004/059192
PCT Pub. Date: Jul. 15, 2004

(65) Prior Publication Data
US 2006/0217222 A1    Sep. 28, 2006

(30) Foreign Application Priority Data
Dec. 30, 2002 (IT) .................................. TO02A1133

(51) Int. Cl.
*F16H 7/12* (2006.01)
*F16H 7/08* (2006.01)
*F16H 7/22* (2006.01)
*F16H 7/14* (2006.01)

(52) U.S. Cl. ......... 474/134; 474/135; 474/133; 474/101; 474/117; 474/118

(58) Field of Classification Search .................. 474/101, 474/133, 134, 135, 117, 118
See application file for complete search history.

(56) References Cited

U.S. PATENT DOCUMENTS

| 4,758,208 | A | * | 7/1988 | Bartos et al. ................. 474/135 |
| 4,906,222 | A | * | 3/1990 | Henderson ................... 474/135 |
| 5,575,727 | A |   | 11/1996 | Gardner et al. |
| 5,919,107 | A |   | 7/1999 | Stepniak |
| 6,689,001 | B2 | * | 2/2004 | Oliver et al. ................. 474/134 |
| 2002/0039944 | A1 | * | 4/2002 | Ali et al. ..................... 474/135 |
| 2002/0086751 | A1 |   | 7/2002 | Bogner et al. |

FOREIGN PATENT DOCUMENTS

CN    148573    3/1930
DE    106 31 507 A1    2/1998

(Continued)

*Primary Examiner* — Michael R Mansen
*Assistant Examiner* — Henry Liu
(74) *Attorney, Agent, or Firm* — Blakely, Sokoloff, Taylor & Zafman LLP

(57) ABSTRACT

A belt tensioner for a belt drive is designed to connect an engine shaft of an internal-combustion engine to a reversible electric machine which has the function of starting motor and current generator; the belt tensioner comprises a fixed part and a pair of arms, hinged on a common pin carried by the fixed part and provided with respective idle pulleys, and a spring, which forces the two arms towards one another so as to load the pulleys elastically against respective branches of the belt. The two arms of the belt tensioner are provided with respective first arrest elements, which are designed to interact with the fixed portion to define respective positions of arrest of the arms themselves under the action of the spring, and respective second arrest elements, which are designed to interact with the fixed portion to define respective positions of end-of-travel of the arms under the action of the pull of the belt.

7 Claims, 4 Drawing Sheets

FOREIGN PATENT DOCUMENTS

| | | |
|---|---|---|
| DE | 199 26 613 A1 | 12/2000 |
| JP | 09177911 | 7/1997 |
| WO | WO 00/77422 A1 | 12/2000 |
| WO | WO 02/29279 A2 | 4/2002 |
| WO | WO 03/050433 A2 | 6/2003 |

\* cited by examiner

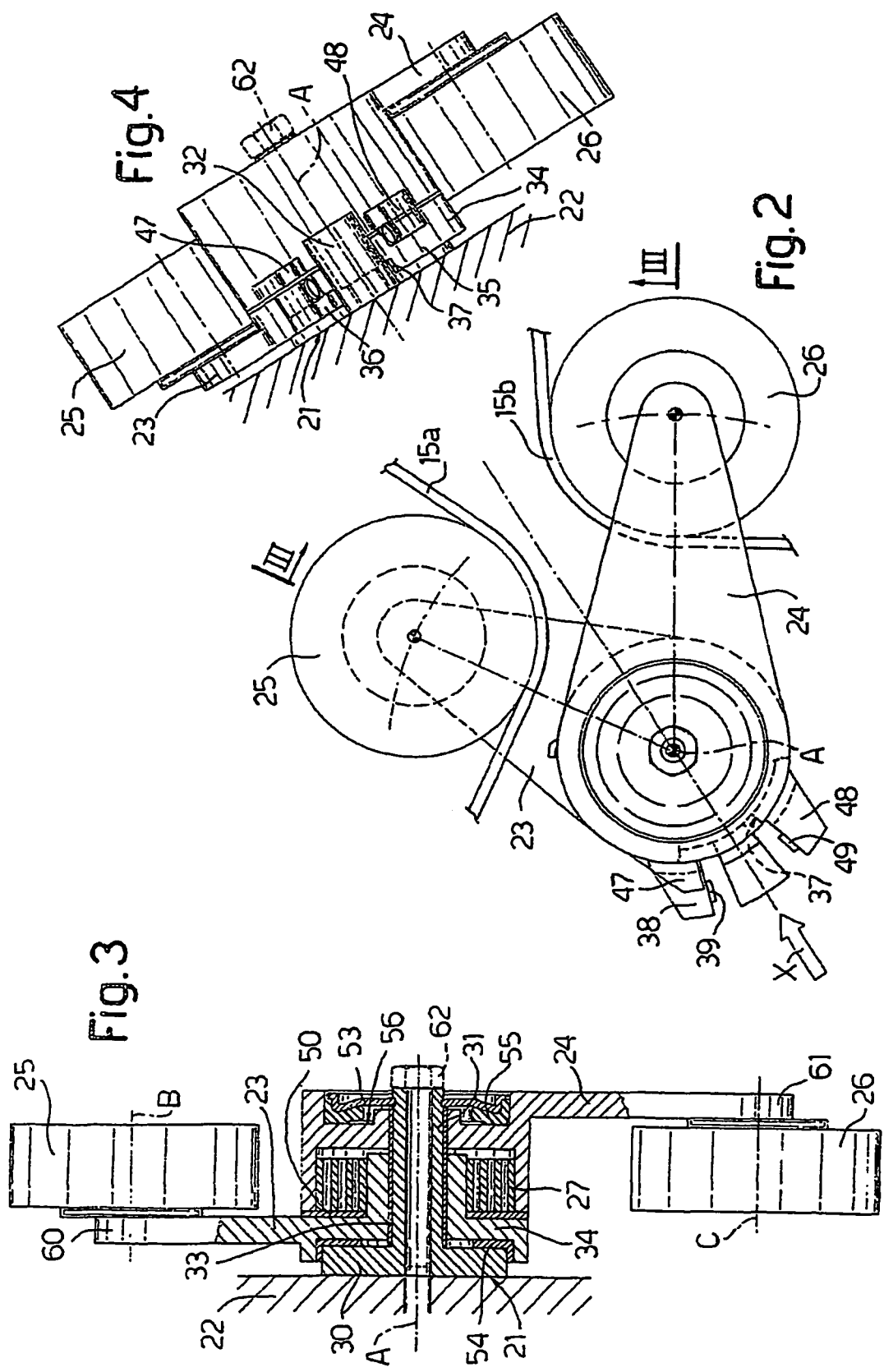

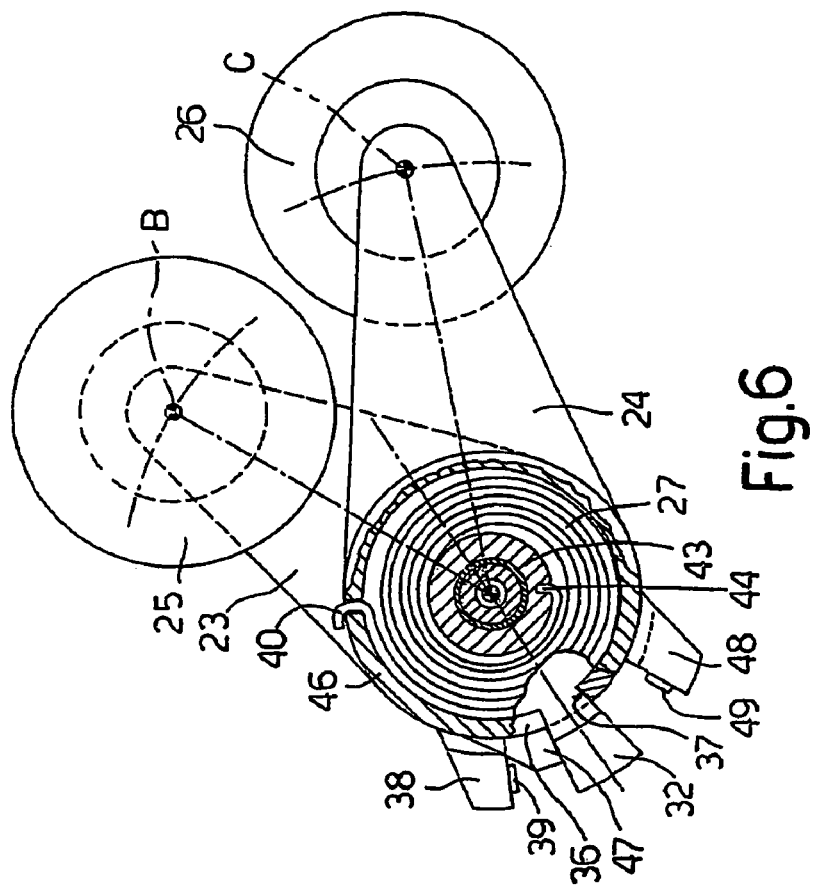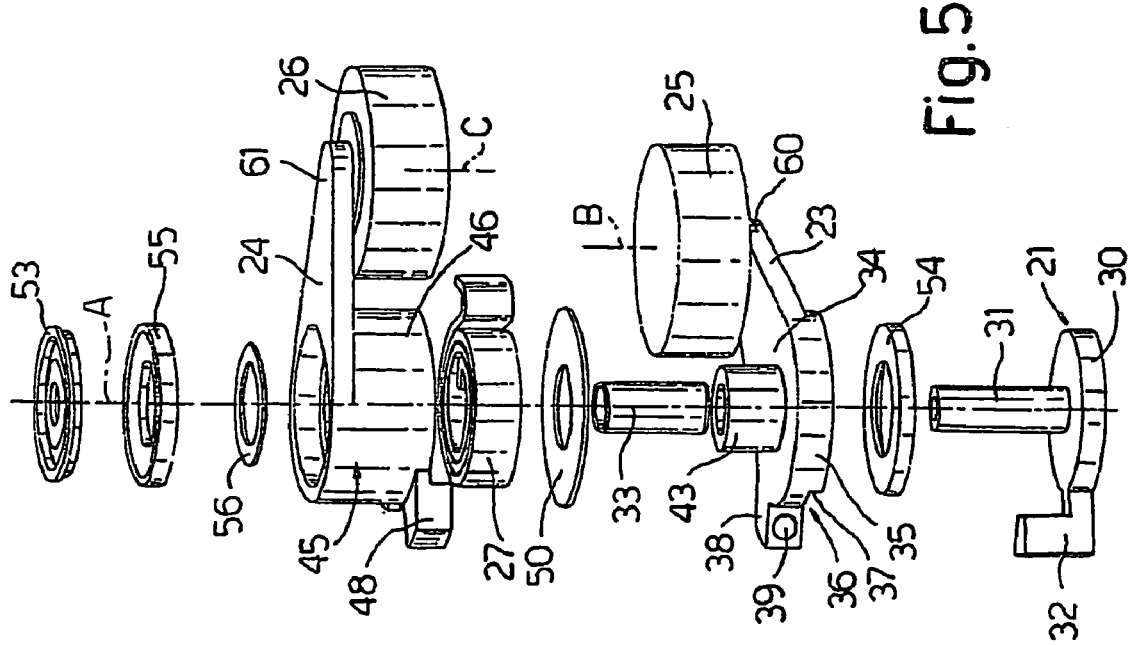

TWO-ARM BELT TENSIONER FOR A BELT DRIVE

CROSS-REFERENCE TO OTHER APPLICATIONS

This is a National Phase of International Application No. PCT/EP2003/051112, filed on Dec. 29, 2003, which claims priority from Italian Patent Application No. TO2002A001133, filed on Dec. 30, 2002.

TECHNICAL FIELD

The present invention relates to a belt tensioner for a belt drive of an internal-combustion engine and in particular to a two-arm belt tensioner for an auxiliary belt drive, which connects the engine shaft of an internal-combustion engine to a reversible electric machine.

BACKGROUND ART

As is known, a current trend of automobile manufacturers is to replace the traditional starting motor and generator with a single reversible electric machine, which is connected to the engine shaft by means of a drive belt. During the starting step, said reversible electric machine functions as a motor and drives the engine shaft of the internal-combustion engine; when the vehicle is in motion, instead, the electric machine is driven by the internal-combustion engine and generates electric current for recharging the battery.

The belt that connects the electric machine to the engine shaft of the internal-combustion engine may be used also for driving one or more further auxiliary members, such as, for example, the compressor of the air-conditioning system.

As is known, normally associated to belt drives is a belt tensioner, i.e., a device provided with an idle pulley mounted on a mobile arm loaded by a spring in the direction of the belt in order to compensate for the variations of tension of the belt itself. The belt tensioner acts on the slack branch of the belt, i.e., on the less-tensioned branch, located downstream of the drive pulley with reference to the direction of motion.

In the case where a reversible electric machine is used, which has the function of starting motor and current generator, the branches of the belt have a different tension according to the mode of operation: the branch that is tensioned during the starting phase, in which the electric machine is the driving member and the internal-combustion engine is the driven member, becomes slack in the stage of normal running, in which the internal-combustion engine is the driving member and the electric machine is the driven member.

To overcome this problem bi-directional belt tensioners or two-arm belt tensioners, i.e., which comprise two arms provided with pulleys, each acting on a respective arm of the belt, have been proposed. The two arms can be mounted on one and the same pin, in order to turn about a common axis and be loaded in the direction of one another by a spring so that the respective pulleys will co-operate with respective branches of the belt, so ensuring their tensioning.

WO-A-00/77422 discloses a belt tensioner including a fixed portion, a first and a second arm hinged to the fixed portion about a common axis and carrying respective idle pulleys, and a spring biasing the arms towards one another to maintain the pulleys in contact with respective branches of a transmission belt.

Stop means are provided to limit the travel of each arm both in the direction of the spring force, so as to define an assembly position of the arms, and in the opposite direction to prevent overtravel of the arms under dynamic pull variations of the belt.

DISCLOSURE OF INVENTION

An object of the present invention is to provide an improved tensioner of the type briefly discussed above, which has a simplified structure in particular regarding the fixed portion.

The above purpose is achieved by a two-arm belt tensioner for a belt drive, comprising: a fixed portion, designed to be fixed to a supporting structure; a first arm and a second arm, carried by said fixed portion and hinged thereto about a common axis; a first pulley and a second pulley, mounted idle on respective ends of said arms and designed to co-operate with respective branches of a belt of said drive; and elastic means, which force said arms towards one another to maintain said pulleys in contact with said respective branches of the belt, said arms comprising first arrest elements, which are designed to interact with said fixed portion to define respective first positions of arrest of said arms under the action of said elastic means, and respective second arrest elements, which are designed to interact with said fixed portion to define respective second positions of end-of-travel of said arms under the action of the pull of said belt, said fixed portion comprising a base plate and a pin fixed to said plate and defining said common axis of rotation of the two arms, said belt tensioner being characterised in that said fixed portion includes an appendage fixed to said base plate and defining an element of contrast for said first and second arrest elements of said arms.

BRIEF DESCRIPTION OF THE DRAWINGS

For a better understanding of the present invention, there will be described in what follows a preferred embodiment, provided purely by way of non-limiting example, with reference to the annexed drawings, in which:

FIG. 2 is a front view of the belt tensioner illustrated in FIG. 1, in a position of installation on the engine, with the drive stationary;

FIG. 3 is a cross-sectional view according to the line III-III of FIG. 2;

FIG. 4 is a side view according to the direction X of FIG. 2;

FIG. 5 is an exploded perspective view of the belt tensioner;

FIG. 6 is a front view of the belt tensioner illustrated in FIG. 1, in a condition of assembly prior to its installation on the engine.

BEST MODE FOR CARRYING OUT THE INVENTION

Figure 1:
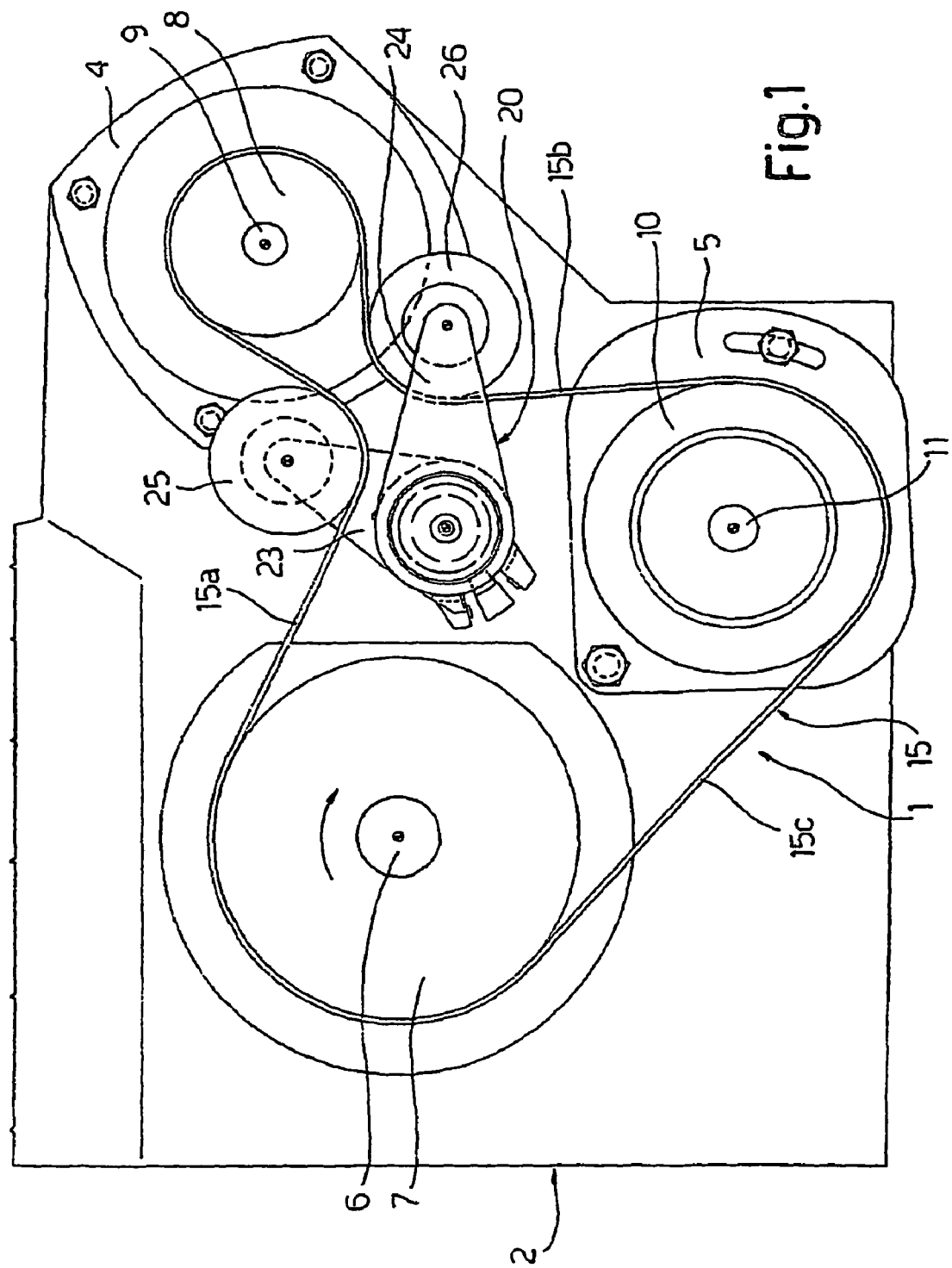
FIG. 1 is a front elevation of a belt drive for an internal-combustion engine provided with a two-arm belt tensioner built according to the present invention.

With reference to FIG. 1, designated as a whole by 1 is a belt drive for an internal-combustion engine 2 of a motor vehicle, for the connection of a reversible electric machine 4, and with an auxiliary member 5, for example a compressor of an air-conditioning system, to an engine shaft 6 of the engine 2.

More in particular, the drive 1 comprises a first pulley 7 fixed to the engine shaft 6, a second pulley 8, which is fixed to a shaft 9 of the electric machine 4, and a third pulley 10 fixed to a shaft 11 of the auxiliary member 5. The drive 1 further comprises a belt (15), which is wound around the pulleys 7, 8, and 10 and consequently has a first branch 15a comprised between the pulley 7 and the pulley 8, a second branch 15b comprised between the pulley 8 and the pulley 10, and a third branch 15c comprised between the pulley 10 and the pulley 7.

Conveniently, the belt 15 is of the poly-V type, and the pulleys 7, 8, and 10 have a corresponding working profile with multiple races (not illustrated).

The direction of rotation of the engine shaft is clockwise, as viewed in FIG. 1.

The electric machine 4 may operate, in a way in itself known, according to two different modes of operation. During normal running, the electric machine 4 is driven by the engine 2 by means of the belt 15 and operates as a current generator. During starting transients, instead, the electric machine 4 absorbs electric power and operates as a driving member. In the latter mode of operation, the engine shaft 6 is driven mechanically by the belt 15.

According to the mode of operation, and in particular according to which is the driving member, the distribution of the tension changes in the various branches of the belt 15. In particular, during normal running, the tension in the second branch 15b ("tensioned branch") is substantially higher than that in the first branch 15a ("slack branch"), whilst during starting, the first branch 15a is tensioned and the second branch 15b is slack.

Finally, the drive 1 comprises a two-arm belt tensioner 20, which co-operates with the belt 15 to ensure proper tensioning in every operating condition.

The belt tensioner 20 (FIGS. 2-4) comprises a fixed part 21 designed to be fixed to a fixed supporting structure 22, for instance a bracket fixed to the engine 2 in an area on the inside of the belt 15 or else a portion of the engine block in said area, a first arm 23 and a second arm 24, hinged to the fixed part 21 about an common axis A and provided with respective idle pulleys 25, 26, which co-operate, respectively, with the branches 15a and 15b of the belt 15.

More in particular, the arms 23, 24 are loaded in the direction of one another by a spring 27, conveniently of the spiral type, and the pulleys co-operate with the external surfaces of the respective branches 15a, 15b of the belt 15.

The elastic characteristic of the spring 27 is chosen so that the return torque exerted thereby on the arm 23 or 24, associated to the tensioned branch of the belt 15, according to the operating condition, is less than the torque exerted on the arm itself by the pull of the belt 15.

The structure of the belt tensioner is described in greater detail in what follows, with particular reference to FIGS. 3 and 5.

The fixed portion 21 comprises a base plate or disk 30, to which there is rigidly fixed a tubular axial pin of axis A. Extending radially from the disk 30 is a substantially L-shaped appendage 32, with the function of arrest element for the arms 23, 24, as will be clarified in what follows.

Figure 7:
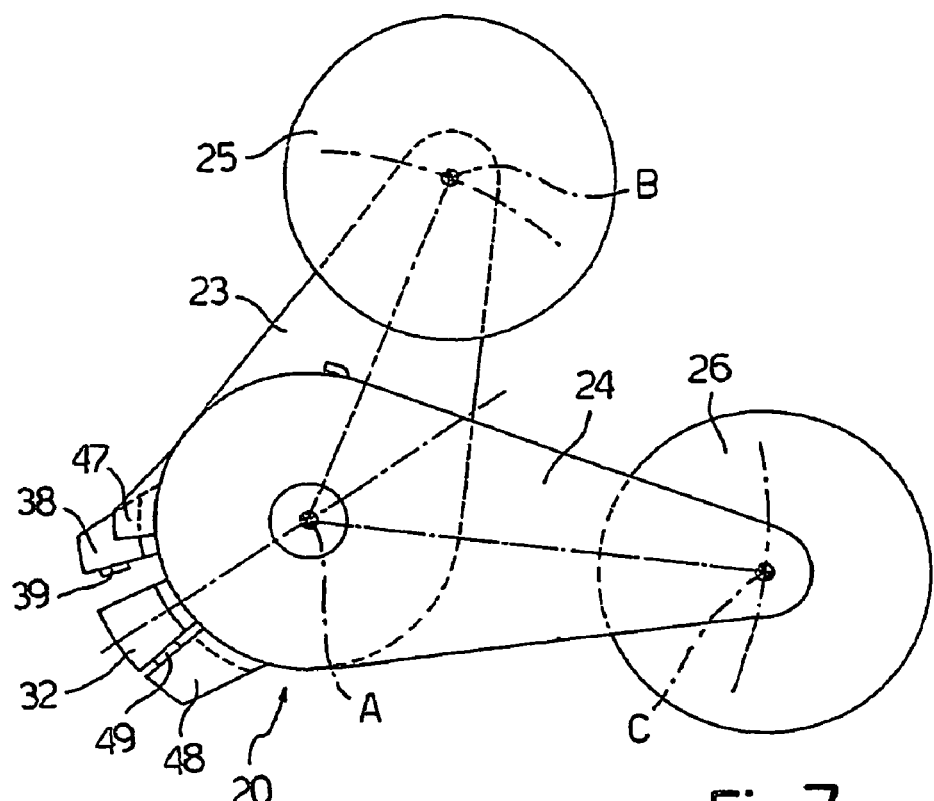
FIG. 7 and FIG. 8 are front views of the belt tensioner in two operating positions corresponding to respective modes of operation of the drive.

The two arms 23, 24 are hinged on the pin 31, with interposition of a radial anti-friction bushing 33. More in particular, the arm 23 is provided with a hub 34 having a substantially circular end, which has, on one of its faces, a projecting circumferential edge 35 designed to surround, in use, the disk 30 of the fixed portion 21. The edge 35 has an interruption or opening 36, located in a position opposite to the main direction of extension of the arm 23, which is engaged in use by the appendage 32. One end of the opening 36 (FIGS. 5 and 6) is designed to co-operate with the appendage 32 in order to define a contrast element 37 of angular arrest for the arm 23 under the action of the spring 27 (which tends to rotate the arm 23 in a clockwise direction, as viewed in FIGS. 5 to 7). In the proximity of an opposite end (not illustrated) of the opening 36, there extends radially a projection, 38, which is provided with a buffer 39, made of elastomeric material, facing the appendage 32 in a circumferential direction. In use, the arm 23 is mounted on the fixed part so that the appendage 32 will come out radially through the opening 36. Consequently, the arm 23 is free to rotate with respect to the fixed part between a first limit position defined by the contact between the appendage 32 and a second limit position defined by the contact between the projection 38 (or rather the buffer 39 associated thereto) and the appendage 32 under the pull of the belt 15.

The hub 34 of the arm 23 further defines fully, on a side axially opposite to the edge 35, an axial tubular sleeve 43, which is able to rotate on the bushing 33 and has the dual purpose of withstanding the moments that cause turning-over and of providing an anchorage, for an internal end 44 of the spring 27 (FIG. 6).

The arm 24 is provided with a substantially cup-shaped end hub 45, which is hinged on the bushing 33 and forms with the hub 34 of the arm 23 an annular cavity, which houses the spring 27 and is delimited radially by a cylindrical wall 46, which extends axially in cantilever fashion from the arm 24 towards the arm 23. The wall 46 defines an anchorage for an outer end 40 of the spring 27 (FIG. 6).

Extending in cantilever fashion from the wall 46 are two radial projections 47, 48, which are set, in use, on opposite sides of the appendage 32 of the fixed part, so as to define respective arrests of the arm 24. In particular, the projection 47 is designed to form an arrest for the arm 24 under the action of the spring 27, which tends to rotate the arm 24 in the counterclockwise direction, as viewed in FIGS. 3 and 5-7. The projection 48 is provided with a buffer 49 made of elastomeric material, which is designed to contact the appendage 32 in a position of maximum rotation of the arm 24 (in the clockwise direction) under the pull of the belt 15.

The arm 24 is therefore free to rotate with respect to the fixed part between the two limit positions defined by the contact against the appendage 32 of the projection 47 and, respectively, of the projection 48 (or rather the buffer 49 associated thereto).

The belt tensioner 20 further comprises, in a conventional way, an anti-friction ring 50, set axially between the arm 23 on one side and, on the other, the spring 27 and the arm 24 so as to reduce as much as possible the relative friction between the two arms 23, 24.

The fixed part 21 of the belt tensioner 20 is completed, in a known way, by a ring 53 for axial blocking, fixed on a free end of the pin 31 by means of plastic deformation of the latter, and by a pair of annular elements 54, 55 made of plastic material, for instance a polyamide 4, 6, set axially one between the disk 30 of the fixed part 21 and the arm 23 and the other between the arm 24 and the blocking ring 20 to define the characteristic of damping of the oscillations of the arms. A Belleville spring 56, set between the arm 24 and the annular element 55, maintains the assembly in axial tension, recovering any play.

The pulleys 25, 26 are mounted idle by means of respective bearings (not illustrated), on the respective free ends 60, 61 of the arms 23, 24 and are free to turn about respective axes B and C.

The belt tensioner 20 is mounted on the supporting structure 22 by means of a single screw 62, which passes through the pin 31. Preferably, the disk 30 of the fixed part has, in a known way, a tooth (not illustrated), which is designed to engage a corresponding seat of the fixed structure 22 to prevent rotation of the fixed part 20 about the axis A.

Operation of the belt tensioner 20 is described in what follows.

Once assembled, but prior to installation on the engine, the belt tensioner 20 is in the condition illustrated in FIG. 6. The action of the spring 27, which loads the two arms 23, 24 in the direction of one another, keeps the arms themselves in the respective positions of arrest defined by the contact of the contrast element 37 and, respectively, of the projection 47 against the appendage 32. The position of the arms 23, 24 is therefore uniquely determined, which facilitates packaging and handling in general of the belt tensioner 20 itself prior to installation on the engine. The angular position of the contrast element 37 and of the projection 47 are defined in such a way that the two pulleys 25, 26 are close to one another but not in contact with one another.

Once the belt tensioner 20 has been mounted on the fixed structure 22 by means of the screw 62, after installation of the belt 15 on the engine 2, it is sufficient to divaricate the arms 23, 24 to bring the pulleys 25, 26 outside the respective branches 15a, 15b of the belt 15 (obviously, this is possible only by displacing the belt in a transverse direction to enable passage of the pulleys).

After this operation, the arms 23, 24 set themselves in a position of rest (FIG. 2), defined by the equilibrium between the pull of the belt 15 and the force of return of the spring 27.

Figure 8:
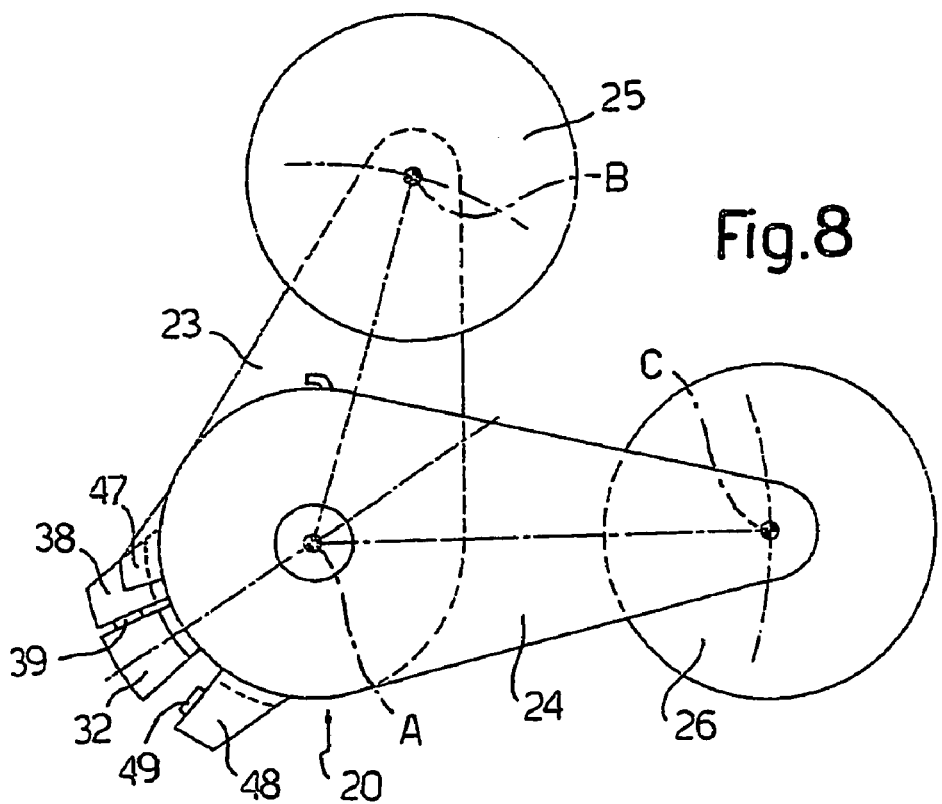

Upon starting, the electric machine 4 works as a motor and drives, by means of the belt drive 1, the engine shaft 6 of the internal-combustion engine 2. Consequently, the branch 15a is the tensioned branch of the belt 15, and the tension of the belt 15 in said branch is such as to overcome the force of return of the spring 27 and to send the arm 23 into the position of arrest, defined by the contact of the buffer 39 of the projection 38 against the appendage 32 (see FIG. 8). The buffer 39 has the function of reducing the contact noise.

In the condition described, the pulley 25 of the arm 23 behaves like a fixed idler pulley or idler. The arm 24, which acts on the slack branch 15b, behaves, instead, as a conventional single-armed belt tensioner and co-operates dynamically with said branch by means of the pulley 26, thus compensating the variations in tension thereof.

Once a pre-set threshold of the speed of the engine shaft 6 has been reached, the engine is supplied and passes from a condition where it is driven to an ignition or firing condition. The branch 15c is now the one at maximum tension of the belt, but also the branch 15b (on account of the relatively reduced resistant torque of the auxiliary member 5) is a tensioned branch, whereas the tension of the branch 15a is considerably lower (slack branch). In this operating condition, the arm 24 is sent to end-of-travel of the tension of the belt 15 and comes to a stop as a result of contact of the buffer 49 of the projection 48 against the appendage 32 (see FIG. 7). The said arm consequently behaves like an idler. The arm 23, which acts on the slack branch 15a behaves, instead, as a conventional single-armed belt tensioner and co-operates dynamically with said branch by means of the pulley 25, thus compensating the variations in tension thereof.

From an examination of the characteristics of the belt tensioner 20 built according to the present invention, the advantages that this enables are evident. In particular, the belt tensioner 20 comprises integrated arrest elements that define the positions of operation of the arms 23, 24 both prior to installation and in working conditions. The belt tensioner 20 is therefore particularly simple and inexpensive to produce, compact, easy to install and to handle prior to installation on the engine, and convenient to install on the engine.

Finally, from the foregoing it is evident that modifications and variations may be made to the belt tensioner 20 described herein, without departing from the sphere of protection of the ensuing claims.

The invention claimed is:

1. A two-arm belt tensioner for a belt drive, comprising:
a fixed portion, designed to be fixed to a supporting structure;
a first arm and a second arm, carried by said fixed portion and hinged thereto about a common axis;
a first pulley and a second pulley, mounted idle on respective ends of said arms and designed to co-operate with respective branches of a belt of said drive; and
elastic means, which force said arms towards one another to maintain said pulleys in contact with said respective branches of the belt, said arms comprising respective first arrest elements, which are designed to interact with said fixed portion to define respective first positions of arrest of said arms under the action of said elastic means, and respective second arrest elements, which are designed to interact with said fixed portion to define respective second positions of end-of-travel of said arms under the action of the pull of said belt, said fixed portion comprising a base plate, a pin fixed to said plate and defining said common axis of rotation of the two arms, said belt tensioner being characterized in that said fixed portion includes a single appendage fixedly attached to said base plate, wherein the single appendage is non-movable relative to the base plate, and wherein the single appendage defines a stop for said first and second arrest elements of said arms so as to define for each arm a travel limited between a first position of arrest and a second position of end-of-travel.

2. The belt tensioner according to claim 1, characterized in that said at least one of said first and second arrest elements of said arms comprises a radial projection, which extends from the respective arm and is designed to interact with said appendage of said fixed portion.

3. The belt tensioner according to claim 2, characterized in that at least one of said arms comprises a hub, which houses at least partially said base plate and is provided with an opening, through which there comes out said appendage, at least one of said arrest elements being defined by an end contrast element delimiting said opening.

4. The belt tensioner according to according to claim 1, characterized in that said first and second arrest elements are provided with respective buffers made of elastic material for absorbing the impact with said fixed portion.

5. The belt tensioner according to claim 1, characterized in that said elastic means comprise a spiral spring and in that one of said arms comprises a cup-shaped hub, which houses said spring said spring being constrained, with its own outer end, to said hub and, with its own inner end, to the other arm.

6. A belt drive for connecting a reversible electric machine to an engine shaft of an internal-combustion engine, said electric machine being operable as an electric machine for starting said internal-combustion engine or as generator, said drive comprising:
at least one first pulley fitted on the engine shaft of said internal-combustion engine;
a second pulley fitted on a shaft of said electric machine; and
a belt wound around said pulleys said belt comprising:
a first branch and a second branch set respectively between said first pulley and said second pulley and between said second pulley and said first pulley in the direction of motion of the belt itself; and a two-arm belt tensioner, which comprises:
- a fixed portion, designed to be fixed to a supporting structure;
- a first arm and a second arm, carried by said fixed portion and hinged thereto about a common axis;
- a first pulley and a second pulley, mounted idle on respective ends of said arms and designed to co-operate respectively with said first branch and with said second branch of said belt; and
- elastic means, which force said arms towards one another to maintain said pulleys in contact with said respective branches of the belt;
- said arms comprising respective first arrest elements, which are designed to interact with said fixed portion to define respective first positions of arrest of said arms under the action of said elastic means; and
- respective second arrest elements, which are designed to interact with said fixed portion to define respective second positions of end-of-travel of said arms under the action of the pull of said belt;
- said fixed portion comprising a base plate, a pin fixed to said plate and defining said common axis of rotation of the two arms, said belt drive being characterised in that said fixed portion includes a single appendage fixedly attached to said base plate, wherein the single appendage is non-movable relative to the base plate, and wherein the single appendage defines a stop for said first and second arrest elements of said arms so as to define for each arm a travel limited between a first position of arrest and a second position of end-of-travel.

7. A belt tensioner according to claim 6, characterized in that said elastic means have a rigidity calculated so as to bring about a rotation of each arm of the tensioner up to the respective second position of arrest in the presence of a maximum value of tension of the respective branch of the belt.

* * * * *